(12) United States Patent  
Byrne

(10) Patent No.: US 6,351,930 B1
(45) Date of Patent: Mar. 5, 2002

(54) FLEXIBLE FLAIL EDGING GUIDE

(76) Inventor: Steven E. Byrne, 10651 Big Bone Church Rd., Union, KY (US) 41091

( * ) Notice: Subject to any disclaimer, the term of this patent is extended or adjusted under 35 U.S.C. 154(b) by 0 days.

(21) Appl. No.: 09/456,760

(22) Filed: Dec. 7, 1999

Related U.S. Application Data

(60) Provisional application No. 60/111,218, filed on Dec. 7, 1998.

(51) Int. Cl.$^7$ ............................................... A01D 34/47
(52) U.S. Cl. ......................................... 56/12.7; 172/17
(58) Field of Search ................................. 56/12.7, 16.9, 56/16.7, DIG. 9; 172/15, 16, 17; 30/276, DIG. 5

(56) References Cited

U.S. PATENT DOCUMENTS

| 4,712,363 A | * | 12/1987 | Claborn | ...................... 56/16.7 |
| 4,914,899 A | * | 4/1990 | Carmine | ...................... 56/16.7 |
| 5,029,435 A | * | 7/1991 | Buchanan | .................... 56/12.1 |
| 5,107,665 A | * | 4/1992 | Wright | ........................ 56/12.7 |
| 5,115,870 A | * | 5/1992 | Byrne | .......................... 172/15 |
| 5,228,276 A | * | 7/1993 | Miller | ......................... 56/12.1 |
| 5,263,303 A | * | 11/1993 | Stroud | ......................... 56/12.7 |

* cited by examiner

Primary Examiner—Robert E. Pezzuto
(74) Attorney, Agent, or Firm—Wood, Herron & Evans LLP

(57) ABSTRACT

A flexible flail trimmer is rendered operable for edging by a guide providing a physical indicator of the edge cutting segment of the rotating string and also providing a gently progressing string plane stabilizing surface producing a narrower operating wobble string thickness than a natural wobble plane thickness of usually greater amplitude. The guide is movable between operative and stowed positions.

9 Claims, 2 Drawing Sheets

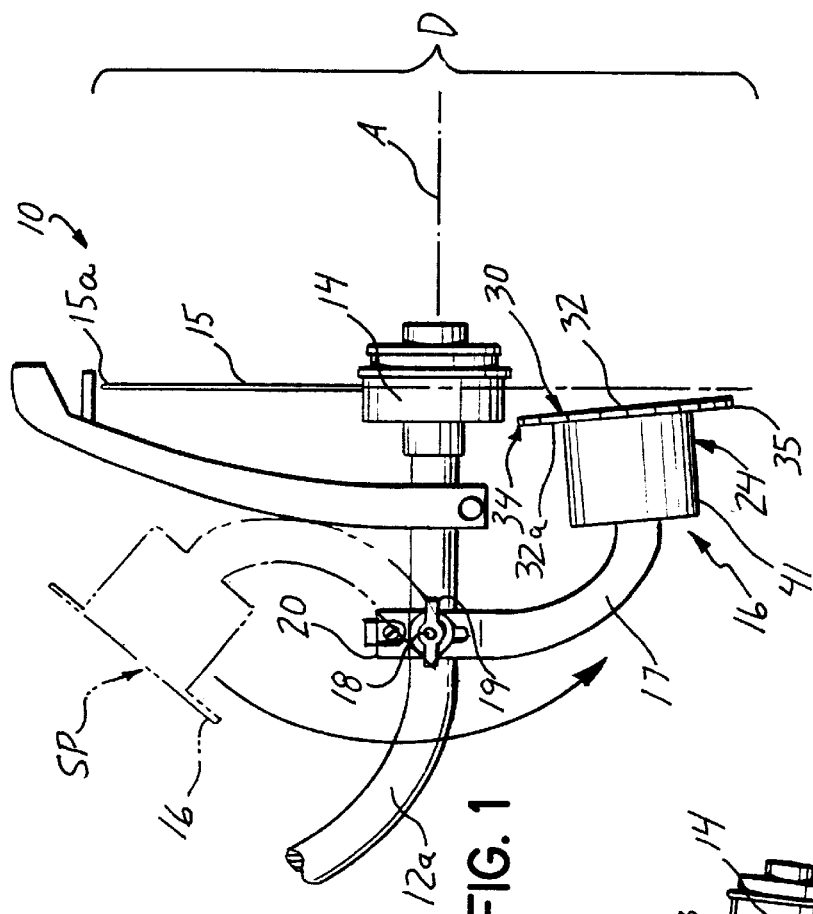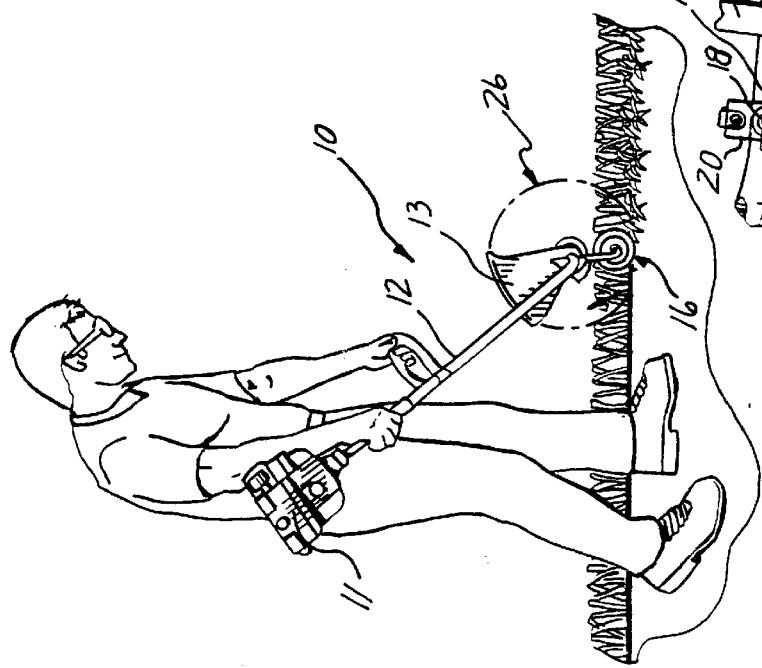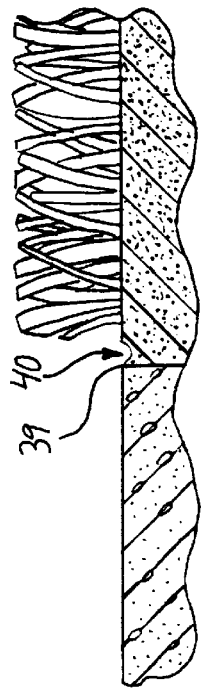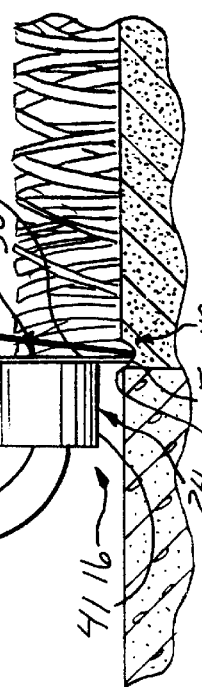

FLEXIBLE FLAIL EDGING GUIDE

Applicant claims the priority of his provisional United States application Serial No. 60/111,218 filed Dec. 7, 1998, and expressly incorporates herein by reference that entire application as filed.

FIELD OF THE INVENTION

This invention relates to flexible flail trimmers for trimming and edging and cutting grass and weeds and other vegetation. More particularly, the invention is directed to a flexible flail apparatus which can be used both for general trimming and for producing a straight, consistent edge in, for example, a lawn adjacent a sidewalk, drive, or other pavement.

BACKGROUND OF THE INVENTION

Flexible flail or "string" trimmers have become very popular tools for trimming grass and weed areas that cannot be reached by a lawn mower. Owners of trimmers also use them to edge vertically, or at some lesser angle than vertical, the edges of curbs, sidewalks and driveways and even mulched beds. They do this because it saves the considerable cost and hassle of having to purchase and use a separate edger, which is usually in the form of a powered metal blade. The cost alone of the least expensive powered edger on the market is as much or more than the initial cost of the usual flexible flail trimmer. In addition, the least expensive powered edger is electrically powered, requiring the use of an extension cord that then has to be dragged about a lawn to be edged. The least expensive gasoline-powered edger on the market is almost twice the price of the initial cost of a flexible flail trimmer even though the same engines can be used by the string trimmer which also power these edgers.

These alone are significant reasons attempting to use a string trimmer to edge. In addition, all powered blade type edgers also use metal blades that are not sharpened. Just like a lawn mower with a very dull blade, the aesthetic result is a chewed appearance of the grass blade tips at the lawns edge rather than a clean crisp cut. Even if one sharpened the metal blade it would not stay sharp long because it comes into contact with the soil, the edge of the pavement and most especially corners of pavement. Often the operators of the blade edgers will edge too far at this junction and literally contact the pavement at the corner.

This is especially detrimental to concrete walks, curbs and driveways because the metal blade actually chips away at the concrete corner. Over time, significant aesthetic and even structural damage occurs to said paved areas.

In contrast, a string trimmer can cut a much crisper edge while not damaging the pavement. In addition, due to the natural tendency of the string to wobble out of its ideal or theoretical inertial path or plane, trimmer operators find that the edge they cut with a vertically held trimmer creates a wider edge than with a blade. This does two things: first a groove is created adjacent to a paved edge that is as much as a half inch or more in width. This looks much more distinctive, doing a better job of outlining the lawn, which most people find pleasing to the eye. Metal blades, on the other hand, are only an eighth of an inch wide, resulting in a narrow, almost imperceptible edge or groove.

Second, since the edge created by the trimmer is wider, the edged appearance lasts longer between edgings. All of these are intuitive reasons people may choose to attempt to use their trimmers to edge rather than purchase a separate edger.

However, there are several significant problems experienced when using string trimmers to edge. The trimmers are usually held freehand while edging, which makes creating a straight, vertical edge a slow, tedious task. And if the operator tries to edge in this manner at walking speeds, the results are usually not straight, sometimes not vertical and almost always wavy and unattractive. There is little physical feedback between the edge of the pavement and the operator trying to hold the free-spinning string in a vertical plane and in the exact lateral position at the edge of the pavement while moving.

The first time a lawn is edged each season is particularly difficult because the lawn has grown all the way over to the pavement edge necessitating removal, not just of the grass stems, but also plant crowns, which are significantly more difficult to cut all the way to the soil. In addition, every time the operator takes a step, the result is the spinning string plane wandering in all directions from that perfect position or hold that could create the perfect edge.

This results in edges being several inches wide in places as well as too deep in some areas, or not all the grass being cut and the operator having to stop and back up to redo a section of edge. This results in crooked, unattractive edges and tedious work for the operator. If he tries to take advantage of the groove he has established this first edging by edging again every week, the result can be a continual widening and deepening of the edge after repeated freehand edgings.

Thus, cutting a straight edge requires a very slow pace for all those except the most accomplished professional trimmer operators. Because of this arduous task, homeowners often will not edge as often as they would if the task were fast and easy.

After a month or two, the edge looks so bad they have to edge again, but essentially have to start from scratch to create a new groove each time. Accordingly, lawns are not edged very often because of the difficulty using a string trimmer to edge, or not at all because of the cost of the blade edgers. And, if a string trimmer is used to edge, it is done ineffectively.

Accordingly, it is desirable to provide a flexible line trimmer capable of consistently edging in terms of depth and straightness. In this regard, there are several edging guides currently on the market. One is described by U.S. Pat. No. 5,107,665 wherein a guide is mounted on the trimmer shaft via a two piece mounting block, an arm and a guide wheel. This guide will index the trimmer's spinning string in a set vertical position. This restricts the depth of cut as an operator proceeds down an edge. However, bigger problems are the lateral orientation of the vertical string plane and the lack of a physical reference of the string end in its cutting area. The guide wheel is nowhere near the plane of the string, and the operator still must try to hold the spinning string, which he cannot see, in the narrow groove. This is still quite hard to do at any reasonable walking rate of speed. A second device on the market manufactured by Homelite is similar to the patented device, except that it does not have a wheel, forcing the operator to walk backward in order to proceed down an edge.

Another aspect of the problem of edging with a flexible flail is the "wobble" of the flail string as it rotates in a plane, the thickness of which is affected by numerous influences. A wide or thick or variable plane is undesirable.

What can be called the natural wobble of the flail would be that wobble amplitude brought about by aerodynamic instabilities of the string itself as it spins. Natural wobble is also brought about by forces stored in the molecular structure of the string, such as where the string has been wound about a spool after manufacture, then is wound in a different way around a storage spool in the trimmer's head. This causes the string's tip to point off in some other direction other than its natural path (with no inertial mass beyond this point to hold it straight, said forces take over even at high RPMs). Another wobble causing influence are those forces that act on the string as a result of the string tip contacting objects in the cutting exercise. These force the string from its theoretical path or plane perpendicular to the axis of rotation and having an amplitude about equal to the thickness of the flail.

Because this natural wobble exists to some degree most of the time and almost constantly during the edging process, not just any string stabilizer surface can be brought into this working path of the string or even adjacent to it. Anything that would offer an obtuse surface to the direction of travel of the string as it spins brings about the kind of disruptive wobble, if not catastrophic wobble, described above. However, if one brings a non-obtuse surface into the working plan, introduces it gradually beginning at the extremes of the string's natural wobble, then gradually brings it further into said path farther along the string's rotational path of travel up to a point immediately adjacent but not in the theoretical path, one can regain control or in essence stabilize the string by bringing its wobble amplitude back closer to its theoretical path. In other words, bringing the wobble amplitude much closer to the width of the string itself (i.e. a theoretical plane). A string plane control or stabilizing surface is described by this applicant in his prior U.S. Pat. No. 5,423,126, which is expressly incorporated herein by reference. However, that stabilizing surface does not provide a physical indicating surface for the actual cutting segment of the string end arc when used to edge.

In yet another aspect of the problem of edging with a flexible string or flail trimmer is the control of that segment of the arc of the rotating flail actually doing the edging. It is not usually possible to actually see that end of the speeding string doing the cutting.

In order to act as an effective edging indicator, a physical indicating surface must be oriented immediately adjacent to the natural path of the string at the cutting segment of the string arc.

Accordingly, it is one objective of the invention to provide a flexible flail trimmer capable of producing straight, consistent edges of lawns along sidewalks, driveways, pavement curbs and other natural breaks between lawns and adjacent surfaces or structures.

Another objective of the invention has been to provide an improved edging guide for a flexible flail trimmer.

A further objective of the invention has been to provide an improved string plane stabilizer for a flexible flail.

A further objective of the invention has been to provide an improved string plane stabilizer for a flexible flail trimmer which facilitates a consistent edge along lawns.

SUMMARY OF THE INVENTION

To these ends, one embodiment of the invention comprises a stepped or flanged wheel having a flange with a surface plane and a circular flange edge. The flanged wheel is selectively positioned by a mounting arm such that its surface plane is acutely angled with respect to a theoretical non-wobbling plane of rotation of the rotating trimmer flail. The edge of the flange approaches the theoretical flail plane proximate the segment of the arc of the flail which does the edging.

The flanged wheel is preferably mounted on an arm attached to the shaft of the trimmer. In an operative position, the arm positions the flanged wheel as noted above. In a stowed position, the arm stows the flanged wheel out of the way of the trimmer flail and preferably behind a guard so it can be used in normal, non-edging trimming.

Accordingly, the flanged wheel accomplishes multiple functions. It guides the trimmer laterally along the edge of a walk, driveway, etc. for consistent lateral spacing for producing a straight line edge; the wheel can ride on the adjacent walk or drive surface next to the lawn for ultimate depth control, if necessary, and the flange physically indicates the edge cutting segment of the string arc.

Moreover and importantly, the flange surface stabilizes the flail or string plane as it enters the cutting segment of the flail arc when edging while at the same time providing a visual, physical indication of that segment of the flail arc doing the edge cutting.

Other objects, advantages and details of the invention will be readily apparent from the following detailed description of a preferred embodiment and from the drawings in which:

BRIEF DESCRIPTION OF THE FIGURES

FIG. 1 is a front view of a flexible flail trimmer modified according to the invention for edging;

FIG. 2 is an illustration of the trimmer of FIG. 1 used for edging;

FIG. 3 is a close-up view of the edging operation of FIG. 2;

FIG. 4 is a view similar to FIG. 3 showing the edging result in cross-section;

DETAILED DESCRIPTION

Figure 5:
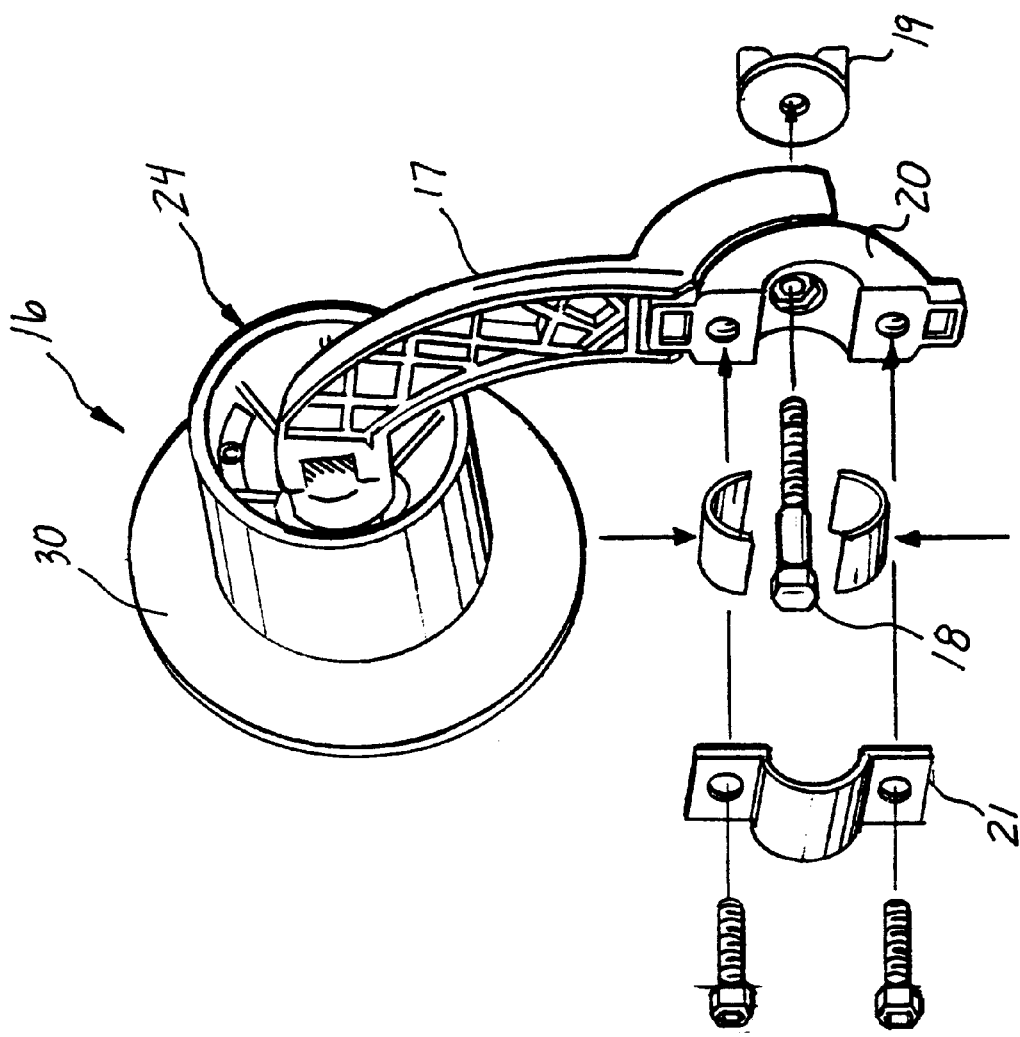
FIG. 5 is an exploded view of the guide according to the invention.

FIG. 1 illustrates a string trimmer 10 with an engine 11, a shaft 12, guard 13, string head 14 and string 15. An edging guide 16 is made of ABS plastic, manufactured by injection molding. The guide 16 is attached to the lower end 12a of the trimmer shaft 12 via an arm 17, which is then attached by a bolt 18 and wing nut 19 to a one-piece mounting block 20. The block 20 is held on shaft 12 by other bolts and a steel strap as shown (FIG. 5).

The guide 16 comprises a stepped wheel 24 for positioning adjacent a theoretical string plane 26. The stepped wheel 24 has a flange 30 with a surface 32 and a circular edge 34. The wheel 24 is placed such that the normal operating diameter "D" of the spinning string extends slightly beyond the outermost edge 35 (in relation to the axis of string rotation) of the stepped wheel flange at edge 35. The outer face 32 of the flange 30 is also angled such that said outermost edge 35 of the flange 30 (that farthest from the axis 28 of the string rotation) resides adjacent to the theoretical string plane, while the rest of the face 32 progressively slopes away from the string plane as it approaches the axis 28 of string rotation. (FIG. 2)

In FIG. 3, the operative placement of the stepped wheel 24 is such that it functions to hold the trimmer and spinning string next to the pavement edge 39 as the operator walks along said edge. The stepped wheel 24 also functions to prevent the spinning string 15 from cutting too deeply into the soil next to the pavement, thus holding the spinning string 15 in an edge groove 40 next to the pavement edge 39 at a maximum depth prescribed by the height of the wheel step.

FIG. 3 illustrates the edging function of the invention wherein a trimmer operator maintains precise control of the spinning string plane when the trimmer is used in the edging (vertical) position.

In the preferred embodiment, the guide 16 can be easily and quickly rotated out of the edging position, into a storage position "SP" near the top of the trimmer's guard (FIG. 1) and out of the way for normal trimming. The guide 16 can be easily removed, by releasing wing nut 19, and stored away from the trimmer, leaving behind the small mounting block 20 on the trimmer shaft 12 for later attachment. This allows the operator to use the trimmer 10 in the trimming (horizontal) position without the apparatus impeding his view of the trimming, or to completely remove and reattach as desired Thus, a flexible flail trimmer, according to the invention, is provided with a surface 32 that is securely attached to the trimmer so it can direct or stabilize the spinning string, yet is positioned immediately adjacent to the spinning plane of the string, so that it can be used to act as both a visual but, most importantly, as a physical indicator of the spinning string plane at the cutting segment of the string arc when edging.

Specifically, said surface 32 is part of a rolling flanged wheel 24, whose outer flange 30 is thin enough to fit in the edging groove 40 (FIG. 3) cut by the spinning string 15. That allows the trimmer to be pushed along an edge just like a walk-behind edger, said flange 30 rolling in the groove 40 created not only by previous edgings, but literally following slightly behind the leading edge of the spinning string 15 as it clears an edge groove 40 wide enough for both string and the flange between vegetation and other assorted debris down to the soil and immediately adjacent to the pavement edge. Guide 16 thus is oriented slightly forward of axis A when used in edging.

The edger guide 16 functions to limit both the width and depth of the groove 40 created by the spinning string while at the same time physically holding said string in a straight groove created adjacent to the pavement. Since most paved edges are created straight, this results in straight edges being created quickly and easily and consistently as the wheel directs the string to cut an edge adjacent to the paved edge. These edges would become a groove that would be covered up by only grass stems if edged on a regular basis because there is not enough time for the grass crowns to grow back into the groove. This makes the amount of effort to cut through the vegetation much less if edged each time the operator takes his trimmer out to trim the lawn, which is usually every mowing or every other mowing.

Operators soon become proficient (as a result of the effectiveness of this device) at applying only the appropriate amount of downward cutting force via engine RPM and the progress speed; that even through the spinning string regularly contacts the soil, the soil displaced at impact by the spinning string is limited to a process by which a further deepening of the groove often does not occur. This is provided by an operator's not pushing the wheel surface 41 down onto the pavement, but rather physically directing the flail by means of the physical, visual reference provided by flange edge 35 at the cutting segment of the string arc and by the engagement of flange 30 on pavement edge 39. This appears to happen because the soil is the heaviest debris created by this process and if these areas are edged, they are most assuredly also blown or cleaned off, which returns the heavier soil back to these edges.

In those circumstances where a deeper groove does occur by pressing down harder, or one already exists, a reduced diameter surface of the wheel, located on the opposite face 32a of the flange that would be wide enough to ride on the pavement's horizontal surface at the edge, is provided. This limits the available depth of the spinning string cut, i.e., depth of groove 40, while the flange 30 still indicates the pavement edge.

The problem with this concept of an indicating surface for the spinning string is that not just any surface can be brought adjacent to the working plane of the spinning string. As a result of many influences, the natural wobble amplitude of the string (i.e. the amplitude or thickness of the path of the string as it spins about an axis) is often considerably more than the theoretical perpendicular inertial path or plane that the width of the string itself would suggest.

As a result, any surface that is brought into this working natural wobble plane can potentially further destabilize the spinning string to the point of loss of function of cutting effectiveness, and often the string being broken at some point short of its end. Further, a surface brought even adjacent to the natural wobble plane of the string can cause problematic disruptions of the spinning string because it only takes one hit by a rapidly spinning string to suddenly cause a large enough increase in amplitude to cause the string to strike this surface again and so on and so on.

To cure this problem, the invention contemplates the flange surface 32 acting as both stabilizing surface and a physical indication of the cutting sector of the string when edging. For descriptive purposes, it will be appreciated that the circular edge 34 of flange 30 is spaced further away from the theoretical string plane that is that same edge at 35, in the cutting segment of the string arc. As the string rotates, the surface 32 and edge 34 gently intrude into the actual wobble plane of the string and stabilize it into an operating plane having a thickness between the thickness of the natural wobble plane as influenced by numerous conditions, and the theoretical plane thickness. This intrusion is gradual, beginning inboard of the string end 15a and moving outward toward that end as the string rotates toward and through the cutting segment of its arc when edging. This gently progressive stabilization face serves to reduce the thickness of the natural wobble plane to an "operating" plane thickness as desired, and does not upset or agitate the string into a wobble of greater amplitude. At the same time, the edge 35 of flange 30 provides the dual function of serving as a physical reference of the cutting segment of the string arc, when edging. As a result, consistent, straight edges are cut with a flexible flail trimmer.

By way of further description of the invention, and functionally, a resulting edge groove 40 is created by the cutting action of the string 15 as it continues to wobble in a reduced amplitude from its natural wobble after being restabilized, yet still making a cut wide enough for both the width of the indicating surface (which is flange edge 35 on that part of surface 32), and the string 15 to exist side-by-side. This edge will usually be wider than the sum of these two widths, yet narrower than the amplitude of the natural string wobble plane.

If, according to the invention, one looks past the natural desire for the spinning string plane to be perfectly vertical and only as wide as the string, or nearly so, the invention contemplates slanting the wheel face slightly away from the spinning string such that that part of the slanted wheel face closest to the spinning string is also nearest the outer tip of the string (for indicating) and creating a stabilizing surface formed by the outer circumference of the wheel face that functions exactly like the stabilizing surface described in U.S. Pat. No. 5,423,126, cited above, but at the same time providing a physical indication of the edge cutting segment of the string arc.

The outer edges 34, as well as the rest of the flange face 32, function to recapture the spinning string if it is wobbling. As the spinning string approaches the wheel face, the first portion of the spinning string that comes into contact with the wheel face is that which is closer to the axis of string rotation and thus has a smaller wobble width than does the outer tip of the spinning string. This portion of the wobbling string (that which is closer to the axis) makes contact with the wheel face surface at a point that is farther away from the natural string plane. As the spinning string plane continues across the face 32, that surface and edges 34 angle back toward the theoretical string plane, gently and progressively forcing the spinning string back toward its narrower theoretical plane.

Just enough of the spinning string needs to extend beyond the closet points between the flange surface 32 and the theoretical plane such that it can effectively do the job of edging by clearing a path in front of the wheel while the slanted wheel face is acting as both the indicator and the stabilizer.

Finally, an operator consideration is placement of the guide. Operators are not accustomed to having any structure placed in their normal trimming field of vision. The operator's trimming field of vision can be defined as that area not covered by the trimmer manufacturer's guard, which usually covers no more than about 45 degrees of a 360 degree arc, whose center is the spinning string's axis. Operators could adversely react to any edging guide placed in a location that is required for the apparatus to function as an edging guide, and remaining there when the trimmer is used for general trimming.

In U.S. Pat. No. 5,107,665, the guide is designed to be left in the position necessary for it to be used as an edging guide all of the time. Tools are required to remove or loosen it from this location on the shaft. The Homelite device described above can be removed without tools but requires removal of a bolt, then replacement of said bolt. The device is then removed entirely from the trimmer and must be carried or stored.

The invention then, in contrast, does an effective job of guiding a trimmer's spinning string down an edge, but then is instantly and easily swung back out of the operator's trimmer field of vision onto the trimmer's guard where it would be, for all practical purposes, invisible to the operator while generally trimming and, until needed to edge again, provides a significant improvement over prior art.

These and other modifications and advantages will be readily apparent to those of ordinary skill in the art without departing from the scope of the invention, and applicant intends to be bound only by the claims appended hereto.

I claim:

1. Apparatus for edging lawns comprising:
   flexible flail apparatus having a trimmer head, motive means and a flail, extending outwardly from the trimmer head, generally perpendicular to an axis of flail rotation;
   a flail guide comprising a surface having a first portion farthest from the axis of flexible flail rotation, said surface residing proximate a theoretical plane perpendicular to said axis, said surface first portion engaging and stabilizing said flail;
   other portions of said surface progressively sloping away from the theoretical plane as they approach the axis of flail rotation.

2. Apparatus for edging lawns and comprising:
   a flexible flail apparatus having a trimmer head and a flail extending therefrom;
   said flexible flail extending outwardly from the trimming head for movement in a first theoretical trimming plane about an axis of rotation; and
   a flail guide surface disposed in a second plane at an acute angle with, and adjacent to, said theoretical plane for guiding said flail toward said theoretical plane.

3. Apparatus as in claim 2 further including a wheel mounted on said apparatus and having a circumferential surface for engagement with a surface adjacent a lawn to be edged for guiding said apparatus along an edge of said lawn, said flail guide surface being attached to said wheel and comprising a flange extending outwardly from said circumferential surface for guiding said flail as it rotates to edge said lawns.

4. Apparatus as in claim 3 wherein said apparatus includes a guard and wherein said wheel is selectively moved between an inoperable stored position near an operative portion of said guard.

5. Apparatus as in claim 3 wherein said wheel is disposed in an operative position ahead of said axis when said apparatus is used to edge.

6. Apparatus for stabilizing rotating flexible trimmer flails for use in edging, wherein such said flail extends outwardly from a trimmer head, generally perpendicular to an axis of rotation, said apparatus comprising:
   a flail stabilizing surface disposed proximate a plane of flail rotation substantially perpendicular to said axis, said surface nearer the flail's axis of rotation tapering away from said plane, said surface proximate said plan for guiding said flail into said plane.

7. Apparatus for guiding a flexible trimmer flail, rotating in a plane having a thickness amplitude defined by a natural wobble of said flail, said apparatus comprising:
   a surface for guiding the rotating flail, said surface disposed adjacent a theoretical flail plane perpendicular to said axis and having a thickness amplitude approximately the same as the thickness of said flail, at a segment of arc of rotation comprising a cutting segment of said flail.

8. A stabilizer for use in a flexible flail trimmer having a flexible flail rotatable about an axis, said stabilizer comprising
   a curved flail stabilizing surface disposed adjacent the flail for engaging and stabilizing the flail, wherein said surface is at an acute angle with respect to a perpendicular plane from said axis with portions of said surface nearest said axis disposed further away from said plane than other portions of said surface disposed nearer said plane.

9. A stabilizer as in claim 8 wherein said stabilizer is a rotatable circular surface.

* * * * *